Patented Sept. 26, 1922.

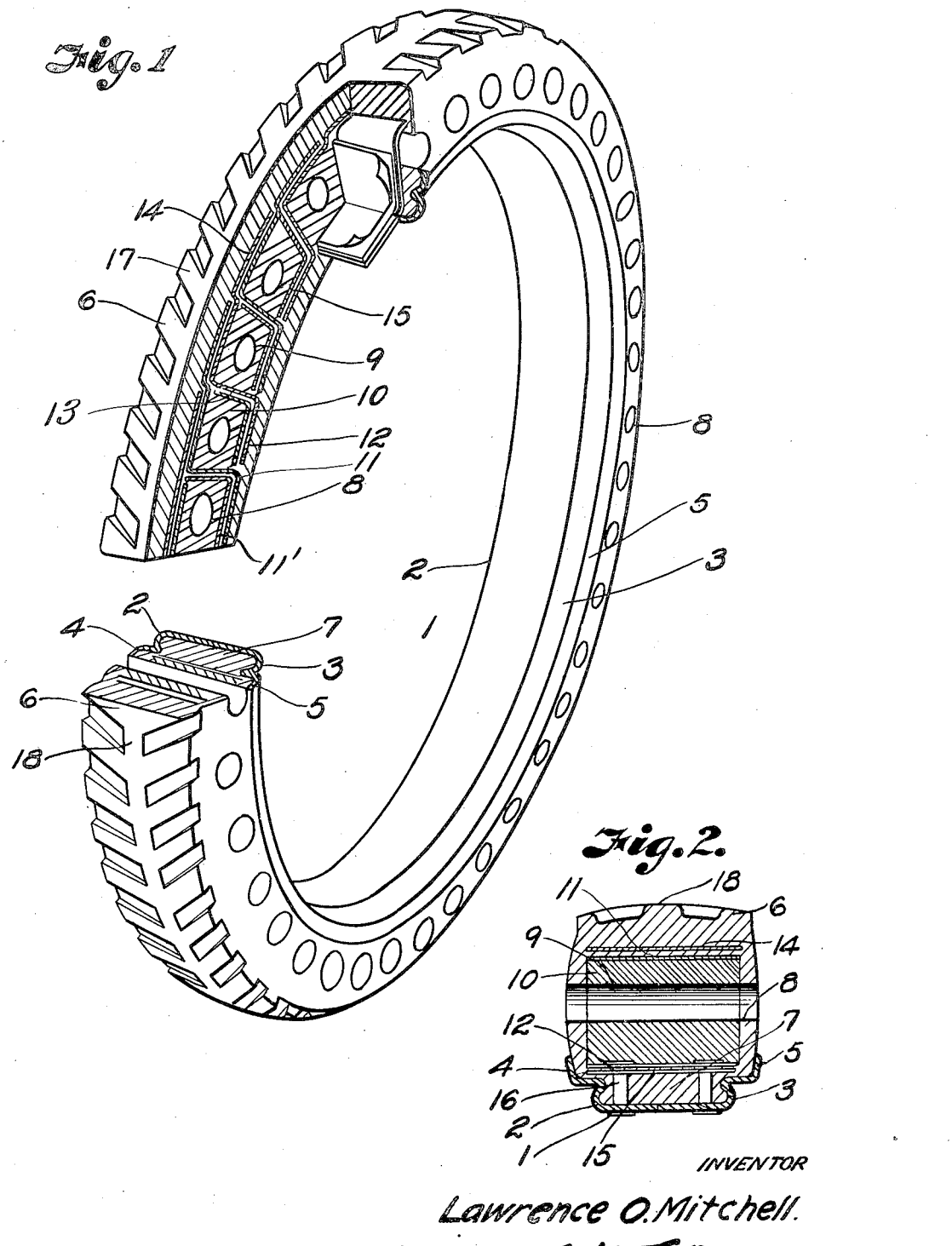

UNITED STATES PATENT OFFICE.

LAWRENCE O. MITCHELL, OF KANSAS CITY, MISSOURI.

TIRE.

Application filed October 15, 1920.  Serial No. 417,091.

*To all whom it may concern:*

Be it known that I, LAWRENCE O. MITCHELL, a citizen of the United States, residing at Kansas City, in the county of Jackson and State of Missouri, have invented certain new and useful Improvements in Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tires for vehicles and particularly to an improved resilient tire for motor vehicles.

One of the objects of the invention is to provide a substantially solid tire which will have considerable resiliency in use, which is capable of considerable milage and which will adequately perform the functions intended.

The invention contemplates a construction in which there is a resilient casing or covering within which is arranged a ring-shaped core consisting of a plurality of blocks of substantially pure rubber, connected by interweaving fabrics, each fabric passing between adjacent blocks and having an end which overlaps the outer face of at least one of the blocks so that the blocks are secured in circular series. The fabrics are secured to a rim by suitable fastening devices, preferably rivets, so that an inner rim is provided for attachment to the felloe of a wheel in a convenient manner, the fastening devices also serving to prevent creeping of the fabrics and, incidently, preventing relative movement between the blocks.

In the drawings,

Fig. 1 is a perspective view, partly in section, of a tire constructed in accordance with my invention, and Fig. 2 is a cross sectional view through the same.

Referring now to the drawings by numerals of reference:

1 designates a rim having crimped side flanges 2 and 3, the lips 4 and 5 of which are adapted to overlap the sides of the tire per se. The tire is shown as consisting of an outer covering or sheathing 6 of rubber with a bead 7 on its inner circumference, to be engaged by the rim 1. The casing is substantially rectangular in cross section and it is provided with a plurality of transverse openings 8, coinciding with corresponding openings 9 in the blocks 10, which constitute the core. The blocks 10 are arranged in circular series, spaced apart with interleaving fabrics 11 between them.

The fabrics 11 are shown as interweaving between the blocks 10. One end 12 of each fabric 11 overlaps the inner face of a block; the outer end 14 overlaps the outer face of at least one adjacent block, and the intermediate portion 13 of each fabric 11 is between two adjacent blocks.

If desired, each fabric 11 may be provided with a short supplemental fabric or ply 11', each of which is shown as applied to the inner face of a block and between the block and the intermediate portion 13 of the fabric 11. The fabrics 11' are for all intents and purposes supplemental plies for the fabrics 11 and they may be applied to the fabrics 11 before the fabrics 11 are interwoven between the blocks.

When the fabrics and blocks are arranged in their circular series, the spaces between the blocks will be filled by the fabrics and the adhesive, which attaches the fabrics 11' to the fabrics 11. There will be no space between the blocks because the radial portions of the fabric and the adhesive will fill up this space.

The fabrics 11 are shown as substantially Z-shaped while the fabrics 11' are substantially L-shaped so that the latter fabrics do not overlap the outer faces of the blocks.

The fabrics are so arranged along the inner faces of the blocks, between them, and overlapping adjacent blocks that when they are secured together, preferably by layers of gum, or other adhesive 15, a complete circular, ring-shaped core will be provided, the blocks being securely held in place against creeping by the fabrics but affording considerable resiliency for the tire.

The inner portions 12 of the fabrics are preferably riveted to the rim by rivets 16, which extend through the bead 7 and through the rim 1 so that the tire casing, the rim and the fabrics will be efficiently secured together.

The tread of the wheel is preferably formed with herring bone ribs 17, with a central, longitudinally extending rib 18, as clearly seen in Fig. 1.

The fact that the blocks are of relatively soft or pure rubber with holes therein coinciding with the openings 8 in the casing of the tire will insure a sufficient resiliency to provide an efficient tire.

What I claim and desire to secure by Letters-Patent is:

1. A tire comprising rubber blocks and binder fabrics between the blocks, one end of each fabric being disposed beneath a block, the other end of each fabric overlapping the outer face of an adjacent block, the intermediate portion of each fabric being between two adjacent blocks.

2. A tire comprising rubber blocks, and binder fabrics, each fabric being positioned between two adjacent blocks and having ends extending in opposite directions to overlap the inner face of one block and the outer face of another block.

3. A tire comprising rubber blocks, and binder fabrics, each fabric being positioned between two adjacent blocks and having ends extending in opposite directions to overlap the inner face of one block and the outer face of another block, the outer end of each fabric extending beyond the face of the block which it overlaps to extend over another block.

4. A tire consisting of a plurality of rubber blocks, binder fabrics in the spaces between the respective blocks and having oppositely disposed ends overlapping the inner and outer faces of the blocks, and a covering for the fabrics and blocks.

5. A tire consisting of a plurality of rubber blocks having tranverse perforations through them, binder fabrics having their intermediate portions interposed between adjacent blocks with their respective ends extending over the inner and outer faces of the blocks in opposite directions, and a covering for said blocks and fabrics.

6. A tire consisting of a plurality of rubber blocks, Z-shaped binder fabrics between the blocks, one end of each fabric overlapping the inner face of one block and the other end overlapping the outer face of an adjacent block, the outer ends of the fabrics overlapping one another, and a covering for said blocks and fabrics.

7. A tire for vehicles comprising a rim, blocks fastened to the rim, fabric interweaving about the blocks to hold them in circular series, and a rubber tread about the blocks, the whole being secured together to form a substantially integral mass.

In testimony whereof I affix my signature.

LAWRENCE O. MITCHELL.